June 12, 1956

E. G. STIMPSON ET AL 2,750,328

AERATING METHOD AND APPARATUS

Filed March 20, 1952

INVENTORS.
EDWIN G. STIMPSON
HENNING A. TREBLER
BY
Campbell, Brumbaugh, Free & Graves
THEIR ATTORNEYS.

United States Patent Office 2,750,328
Patented June 12, 1956

2,750,328
AERATING METHOD AND APPARATUS

Edwin G. Stimpson, Sayville, and Henning A. Trebler, Oakdale, N. Y., assignors to National Dairy Research Laboratories, Inc., Oakdale, N. Y., a corporation of Delaware Application March 20, 1952, Serial No. 277,580

4 Claims. (Cl. 195—142)

This invention relates to aeration and, more particularly, to fermenting apparatus and to a method for promoting the growth of aerobic organisms, such as yeast.

Liquid agitators are well known wherein a container is provided with a vertical open-ended tube having an impeller at its lower end which causes circulation down through the interior of the tube and then up around the outside thereof. Agitators of this general type have heretofore been employed in aerators, specifically, in fermentors. The fresh air necessary for growing aerobic organisms, such as yeast, has been introduced from the top of the container. This has represented a mechanically difficult and inefficient expedient. One of the unfortunate results has been the generation of excessive foam, which must be combated by the addition of a foam breaking agent, an undesirable ingredient in the final product.

It is an object of the invention to provide a simple and inexpensive method of and apparatus for introducing air into a liquid. It is a further object to aerate efficiently a nutrient solution to ensure optimum growth of aerobic organisms.

According to the one aspect of the invention these objects of the invention are attained by providing a container of nutrient solution wherein air is admitted near the bottom of the container between a rotatable impeller and a vertical open-ended tube. The impeller includes a horizontal disk which prevents escape of air through the tube and has blades closely adjacent the lower end of the tube for drawing solution down through the tube and dispersing air throughout the solution.

Figure 1:
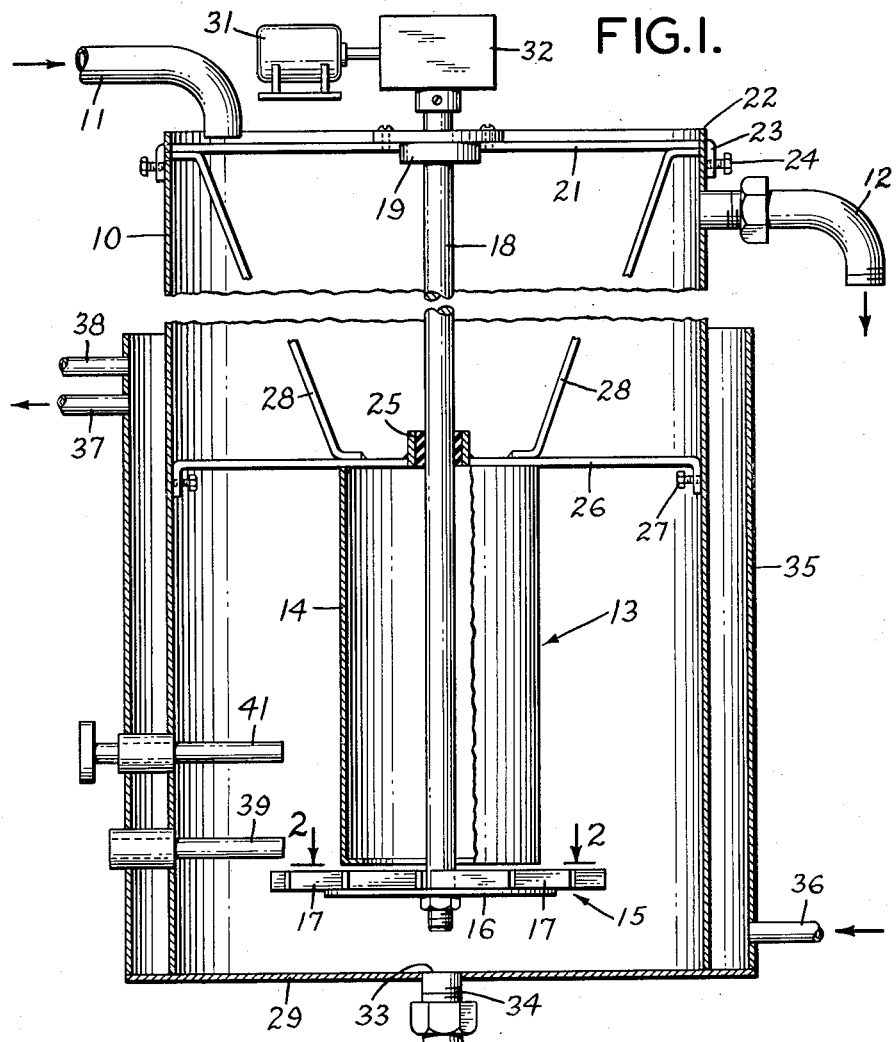
Figure 2:
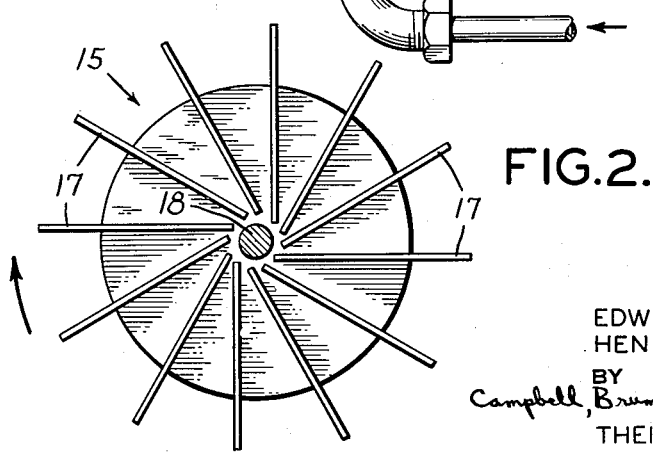

In order that the invention may be more clearly understood it will now be described in detail with reference to the accompanying drawings wherein:

Figure 1 is a view in elevation of the fermentor of the present invention with portions broken away for illustrative purposes, and Figure 2 is a transverse sectional view of the fermentor taken along the dashed line 2—2 of Figure 1 in the direction indicated by arrows.

Referring now to the drawings, a cylindrical container 10 is shown in a vertical position. The container 10 is arranged to be continuously supplied liquid through an inlet pipe 11, and aerated liquid is simultaneously withdrawn through an outlet pipe 12 for further processing. An agitator assembly 13 is removably mounted within the container 10. The agitator assembly 13 primarily comprises a vertical open-ended cylindrical downdraft tube 14 concentric with the container 10 and a rotatable impeller 15 located immediately below the tube 14.

The impeller 15, as more clearly shown in Figure 2, comprises a horizontal disk 16 on the upper surface of which are fastened impeller blades 17. The disk 16 has a diameter somewhat greater than the diameter of the tube 14. The blades 17 may be cast integral with the disk 16 or may be formed from angle irons. The blades 17 extend tangentially from an inner circle concentric with the axis of rotation to the periphery of the disk 16 and may project somewhat beyond the same.

The impeller 15 is bolted to the end of a drive shaft 18 which extends upwardly through the center of the tube 14 and projects out of the top of the container 10. The shaft 18 is rotatably supported near the top of the container 10 by a bearing 19 which is centrally secured by three equi-angularly separated horizontal braces 21. The braces diverge from the bearing 19 along radii of the container 10 and are adapted to rest on the upper rim 22 thereof. The terminal portions 23 of the braces 21 are bent downward through a right angle to overlap loosely the outside of the container 10. Bolts 24, threaded through the terminal portions 23, may be tightened against the outside of the container 10. A further bearing 25, preferably of the liquid-lubricated type, supports the shaft 18 within the container 10. Three radial braces 26 diverge from the bearing 25 and terminate at the wall of the container. Bolts 27 are provided at the ends of the braces 26 for abutting the inside of the container 10. Diagonal braces 28 interconnect braces 21 and 26. The downdraft tube 14 is fastened, as by welding, to the braces 26 and extends without the necessity of further support toward the bottom 29 of the container 10.

For easy cleaning the agitator assembly 13 including the shaft 18, downdraft tube 14 and impeller 15 may be withdrawn as a unit from the container 10 by merely loosening the bolts 24 and 27.

The shaft 18 is adapted to be rotated by a motor 31 through reduction gearing 32 causing the blades 17 to rotate in a horizontal plane. The clearance between the top of the blades 17 and the lower end of the tube 14 is sufficiently small to create a substantial suction or downdraft of liquid through the tube 14 as a result of the centrifugal force applied by the blades 17 to the liquid near the bottom of the container 10. The contents of the container 10 are therefore violently agitated and also circulated in a central zone downwardly through the tube 14 and upwardly in an annular zone between the outside of the tube 14 and the vertical wall of the container 10.

In order to aerate the contents of the container 10 an air inlet 33 is provided directly beneath the impeller 15 and may, as illustrated, comprise merely a tube 34 which penetrates the center of the bottom 29 of the container 10. In large scale apparatus the air may be injected through a sparge pipe having numerous outlets which distribute the incoming air over a substantial area beneath the impeller 15. As the air from the inlet 33 attempts to rise through the contents of the container 10, it is prevented from passing into the tube 14 by the shielding effect of the disk 16. In the process of flowing around the periphery of the impeller 15, the air is substantially completely dispersed in the liquid. For optimum efficiency the disk 16 is positioned close to the air inlet 33.

Where, as in the production of aerobic organisms, such as yeast, it is necessary to maintain the temperature of the contents of the container 10 within a definite range of temperatures, an annular water jacket 35 may be provided surrounding the vertical wall of the container 10. The water jacket 35 is furnished with a water inlet 36, a water outlet 37 and a water overflow outlet 38. A thermostat 39 and a thermometer 41 penetrate through the water jacket 35 into the interior of the container 10 in order to provide temperature control and indication, respectively.

In a specific embodiment of the present invention employed as a continuous fermentor, the diameter of the container 10 was 68 inches and the downdraft tube 14, having a height of 48 inches and a diameter of 24 inches, was centrally positioned with its lower end 12 inches above the bottom of the container. The impeller 15 was formed with a disk 16 that was 28 inches in diameter and provided with twelve blades having a height of 2½ inches and a length of 18 inches. The clearance between the top of the blades 17 and the lower end of the downdraft tube 14 was of the order of 1/32 of an inch. The distance from the lower surface of the disk 16 and the bottom of the container 10 was approximately 9 inches. This construction provided excellent dispersion of air in a nutrient solution when the impeller 15 was operated at 125 revolutions per minute.

It is apparent from the above description that an aerator of very simple construction has been provided capable of yielding a finely dispersed mixture of air and nutrient solution without the mechanical complications accompanying the introduction of air from the top of the container or through the rotating elements of the impeller.

It is to be understood that various changes and modifications may be effected within the scope of the invention. For example, although it is convenient, it is not necessary that the disk 16 rotate with the blades 17. Accordingly, the illustrated embodiment is to be regarded as exemplary only and the invention only limited by the appended claims.

We claim:

1. An aerator comprising a container of liquid, an open-ended vertical tube positioned in said container with a lower end adjacent the bottom thereof and with its upper end positioned below the top of said container, an air inlet near the bottom of said container beneath the lower end of said tube, a shield member having a diameter greater than said tube between said air inlet and said tube to prevent escape of air through said tube, and rotatable impeller blades between said shield member and said tube for drawing liquid down said tube and dispersing air throughout the liquid.

2. A fermentor comprising a container of nutrient solution, an open-ended vertical tube centrally located in said container with its lower end adjacent the bottom of said container and its upper end below the top of said container, an air inlet in the bottom of said container opposite the lower end of said tube, a horizontal plate having a diameter greater than said tube between said air inlet and said tube to prevent escape of air through said tube, and rotatable impeller blades between said plate and said tube for drawing solution down said tube and dispersing air throughout the solution.

3. A fermentor comprising an upright cylindrical container to which nutrient solution is supplied and from which aerated solution together with aerobic organisms are withdrawn, a concentric open-ended downdraft tube located in said container with its lower end adjacent the bottom of said container and its upper end below the top of said container, an impeller formed as a solid horizontal disk with blades on the upper surface thereof, said disk having a diameter larger than the lower end of said tube and positioned immediately beneath the same, and an air inlet beneath said impeller.

4. A fermentor comprising an upright cylindrical container to which nutrient solution is supplied and from which aerated solution together with aerobic organisms are withdrawn, a concentric open-ended downdraft tube located in said container with its lower end adjacent the bottom of said container and its upper end below the top of said container, an impeller formed as a solid horizontal disk with substantially vertical blades on the upper surfaces thereof extending in a generally radial direction and projecting beyond said disk, said disk having a diameter larger than the opening at the lower end of said tube and positioned immediately beneath the same, and an upwardly directed air inlet beneath said impeller.

References Cited in the file of this patent

UNITED STATES PATENTS

| | | |
|---|---|---|
| 2,174,540 | Wallace et al. | Oct. 3, 1939 |
| 2,183,071 | Guthrie et al. | Dec. 12, 1939 |
| 2,189,779 | Daman | Feb. 13, 1940 |
| 2,269,583 | Dromgold | Jan. 13, 1942 |